United States Patent
Van Der Mee et al.

(10) Patent No.: US 9,170,385 B2
(45) Date of Patent: Oct. 27, 2015

(54) CONNECTION SYSTEM FOR AN OPTICAL CABLE

(75) Inventors: Marnix Van Der Mee, Montlouis-sur-Loire (FR); Benoit Dupeux, Oyeu (FR); Roxane Valentin, Eybens (FR); Renaud Durand, Grenoble (FR)

(73) Assignee: RADIALL, Rosny-Sous-Bois (FR)

( * ) Notice: Subject to any disclaimer, the term of this patent is extended or adjusted under 35 U.S.C. 154(b) by 0 days.

(21) Appl. No.: 13/979,786

(22) PCT Filed: Jan. 23, 2012

(86) PCT No.: PCT/IB2012/050306
§ 371 (c)(1),
(2), (4) Date: Jul. 15, 2013

(87) PCT Pub. No.: WO2012/101569
PCT Pub. Date: Aug. 2, 2012

(65) Prior Publication Data
US 2013/0294731 A1   Nov. 7, 2013

(30) Foreign Application Priority Data
Jan. 28, 2011   (FR) ..................................... 11 50677

(51) Int. Cl.
*G02B 6/36*   (2006.01)
*G02B 6/42*   (2006.01)

(52) U.S. Cl.
CPC ............ *G02B 6/4219* (2013.01); *G02B 6/4201* (2013.01); *G02B 6/4292* (2013.01)

(58) Field of Classification Search
CPC .. G02B 6/3887; G02B 6/3825; G02B 6/4292; G02B 6/3897; G02B 6/3849; G02B 6/42; G02B 6/036
USPC .......................................... 385/53, 76, 88, 92
See application file for complete search history.

(56) References Cited

U.S. PATENT DOCUMENTS

| 5,511,140 | A * | 4/1996 | Cina et al. ........................ 385/93 |
| 6,361,221 | B1 | 3/2002 | Halbach |
| 6,390,689 | B1 | 5/2002 | Azimi et al. |
| 2004/0218873 | A1 | 11/2004 | Nagashima et al. |
| 2010/0112849 | A1 | 5/2010 | Malstrom et al. |
| 2010/0260456 | A1* | 10/2010 | Alcaraz et al. .................. 385/76 |
| 2011/0003501 | A1 | 1/2011 | Greub et al. |

FOREIGN PATENT DOCUMENTS

| EP | 0 726 477 A2 | 8/1996 |
| EP | 1 018 660 A2 | 7/2000 |
| EP | 2 239 605 A1 | 10/2010 |
| WO | 2008/127336 A1 | 10/2008 |
| WO | WO 2009/100796 A1 | 8/2009 |

OTHER PUBLICATIONS

Apr. 17, 2012 Search Report issued in International Patent Application No. PCT/IB2012/050306 (with translation).
Apr. 17, 2012 Written Opinion issued in International Patent Application No. PCT/IB2012/050306 (with translation).
Sep. 13, 2011 Written Opinion issued in French Patent Application No. FR1150677 (with translation).

* cited by examiner

*Primary Examiner* — Jennifer Doan
(74) *Attorney, Agent, or Firm* — Oliff PLC

(57) ABSTRACT

The present invention provides a plug for mounting on at least one cable having at least one optical conductor, the plug comprising a body and including at least one optoelectronic converter provided with connection means arranged inside the body in a manner that is removable and interchangeable.

20 Claims, 6 Drawing Sheets

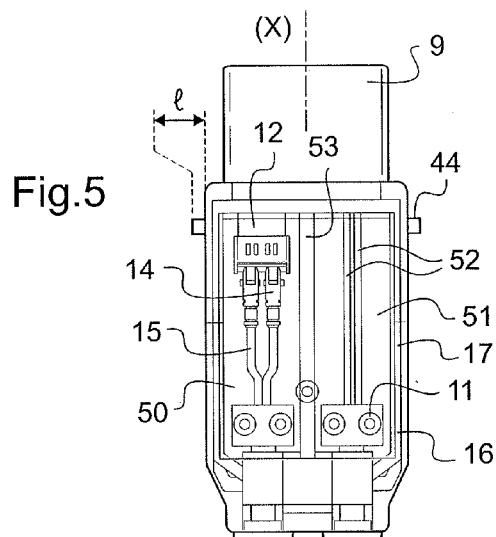
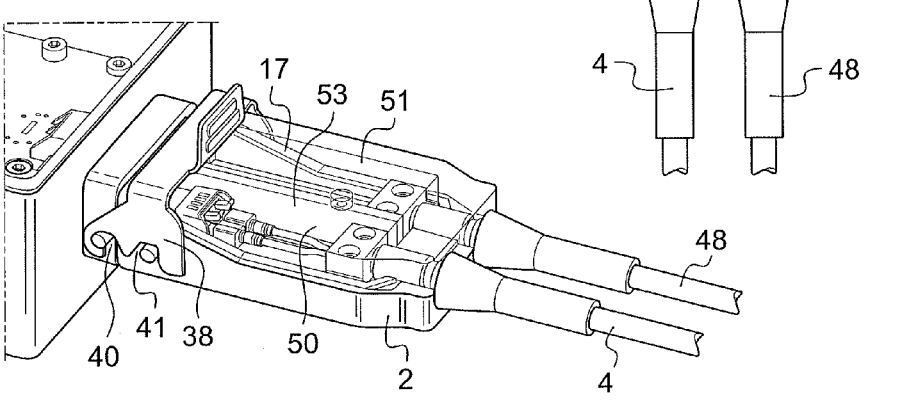
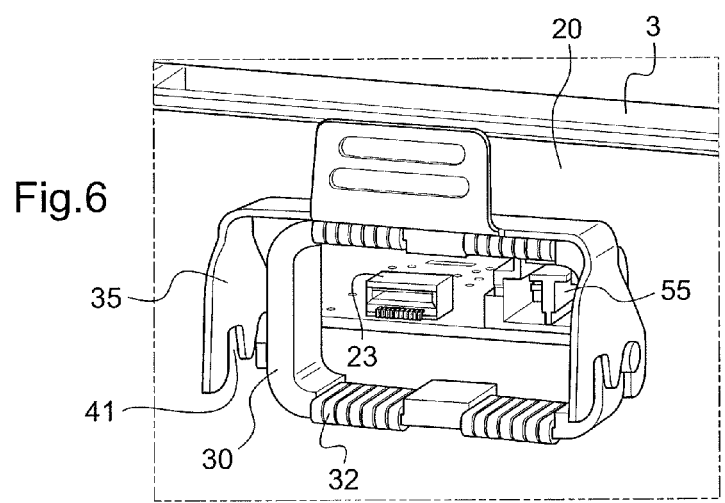

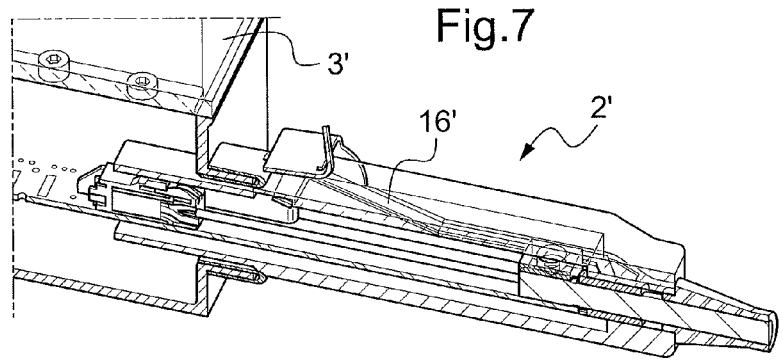
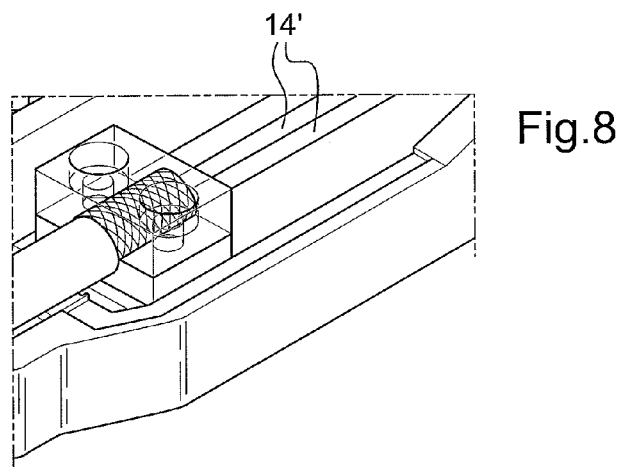
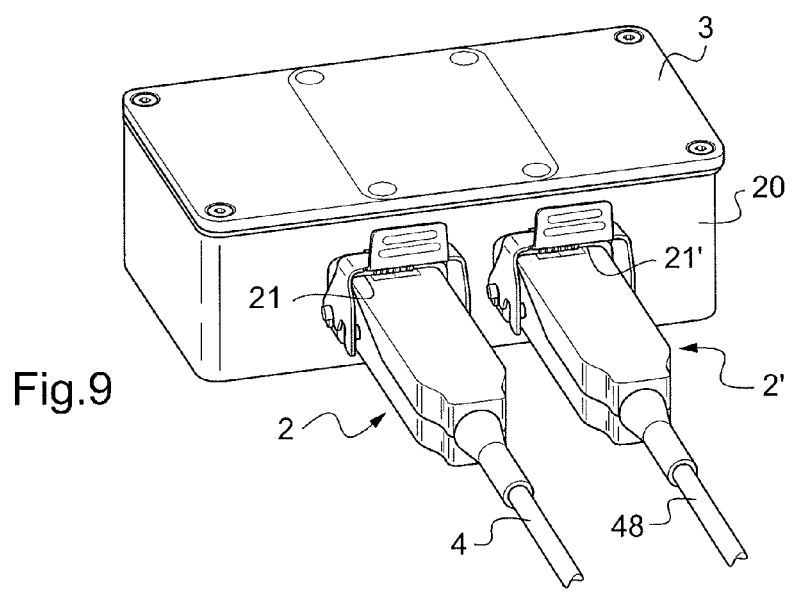

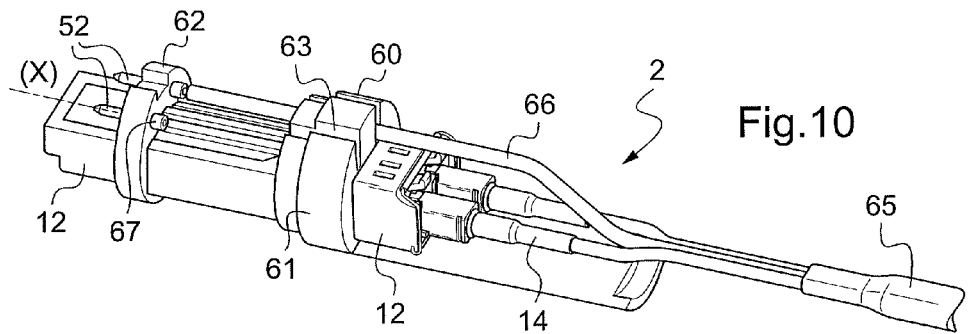
Fig.10
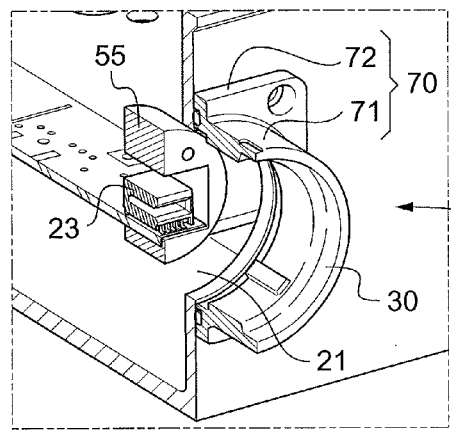
Fig.11
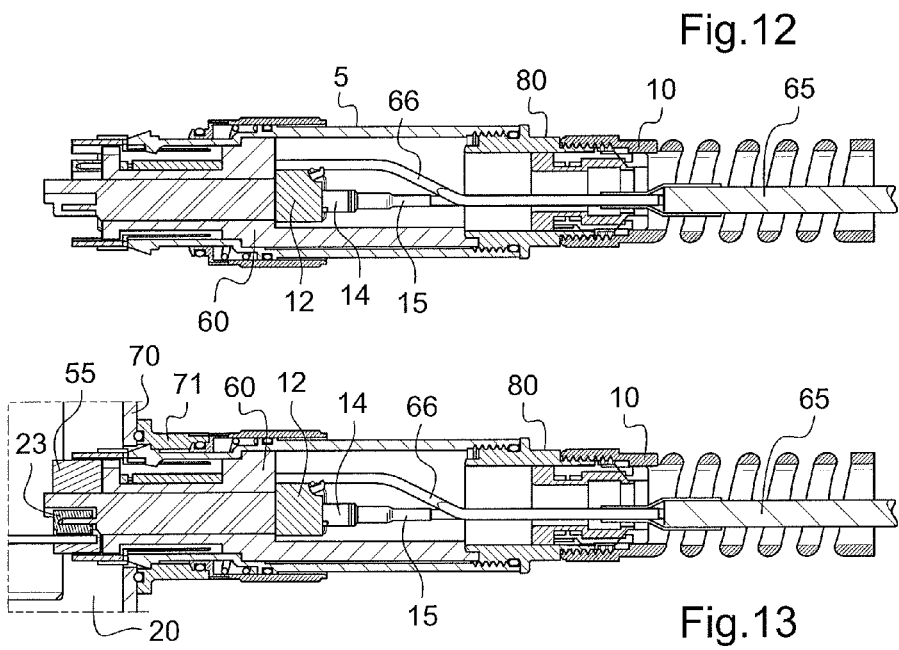
Fig.12
Fig.13

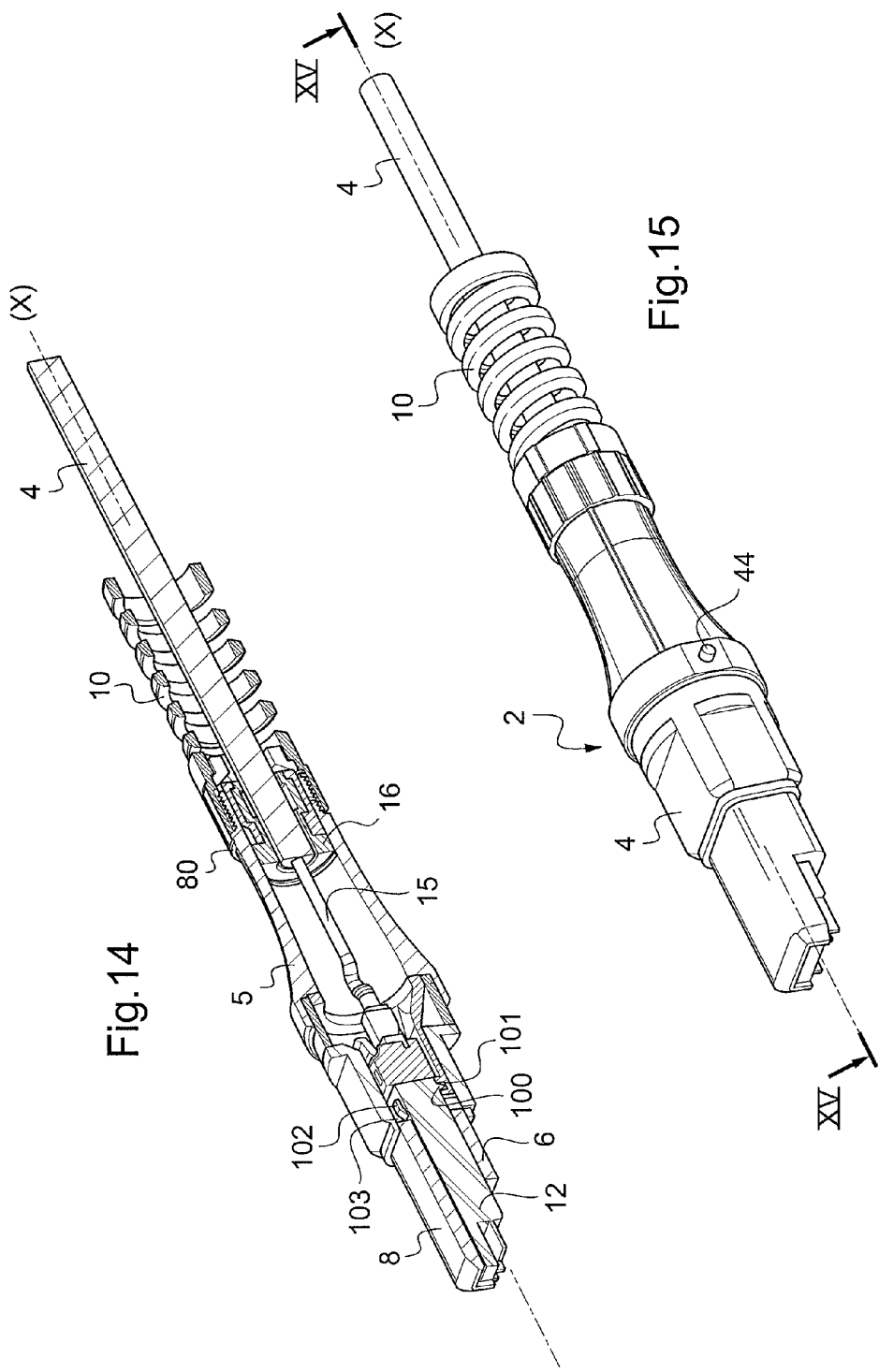

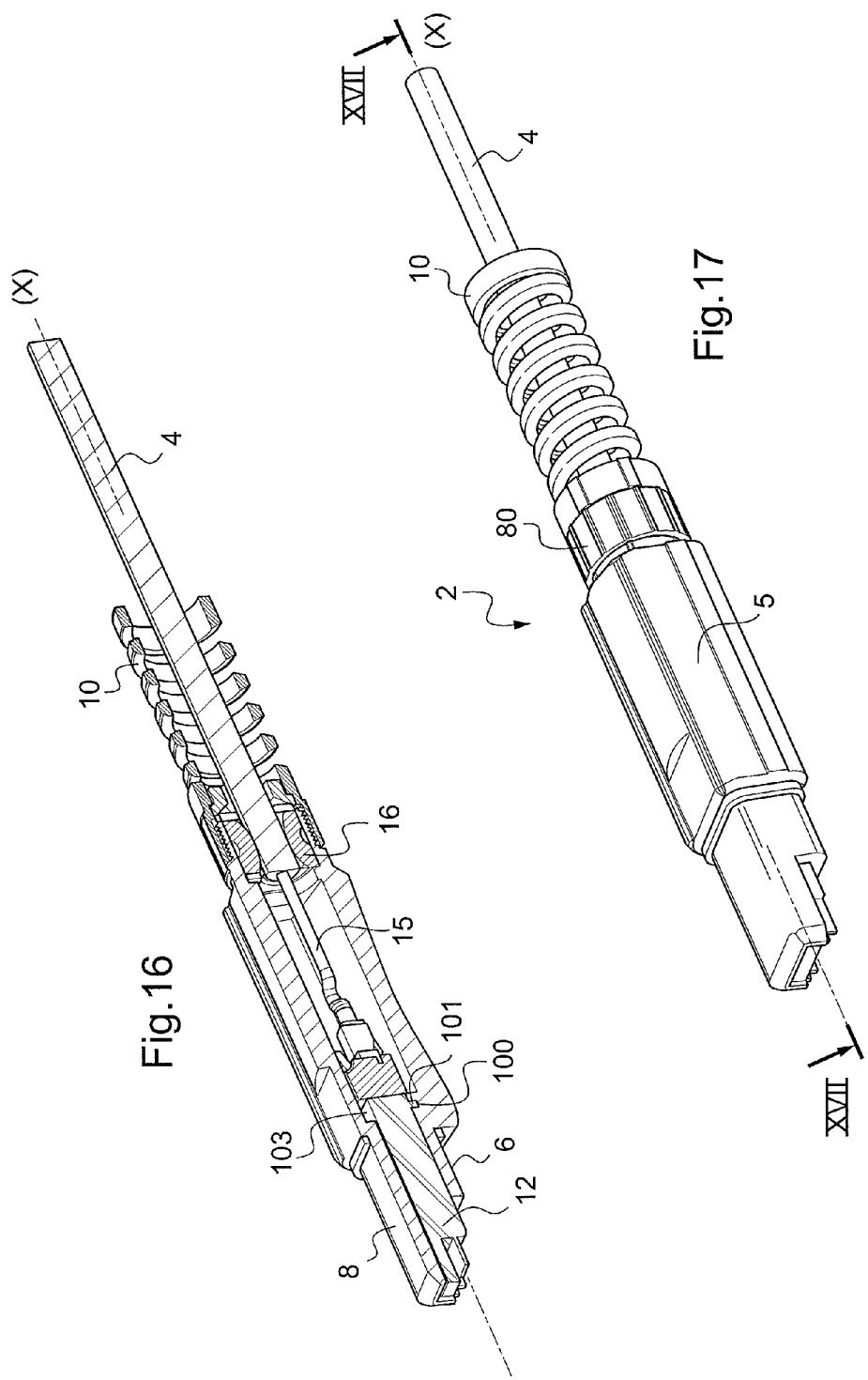

CONNECTION SYSTEM FOR AN OPTICAL CABLE

BACKGROUND OF THE INVENTION

The present invention relates to a plug of the "over connector" type for mounting on at least one cable having at least one optical conductor, and also to a receptacle configured to be connected to the plug.

The invention applies to a plug having at least one optical channel and mounted on a cable including at least one optical conductor, such a plug being used for example in telecommunications installations such as relay antennas for mobile telephony, in broadband data transmission networks for domestic or industrial use, for networks of monitoring cameras, or indeed for data transmission in railway installations. When such a plug is mounted on a cable, they may be referred to together as an active cable assembly.

It is known to use optical plugs having an optoelectronic converter provided with connection means of the kind described for example in European patent application EP 0 726 477, and also known as "transceiver" means. In known plugs, the optoelectronic converter is carried by a receptacle connected to a printed circuit card, e.g. as described in application WO 2009/100796.

Because of the arrangement of the optoelectronic converter in the receptacle, it can happen that the heat generated in the optoelectronic converter is not dissipated in satisfactory manner. Furthermore, an outlet from the optoelectronic converter is for connection to one or more optical contacts carried by a plug. Making a connection between optical contacts and the optoelectronic converter can be made more difficult because it implies connecting together a receptacle and a plug.

Furthermore, incorporating the optoelectronic converter in the receptacle makes it more difficult to have manual access to the device for unlocking the optical contacts of the plug. It can then be found necessary to have recourse to a device that makes it possible to synchronize unlocking of the optical contacts with unlocking of the plug.

In addition, with a receptacle having an optoelectronic converter incorporated therein, it can be difficult to obtain satisfactory alignment between the electrical interface of the plug and that of the receptacle, in spite of the tolerances specified by the manufacturers.

It can also be found difficult to fit a receptacle with an incorporated optoelectronic converter presenting different optical interface standards, such as optical interfaces using LC or SC optical contacts.

There exists the need to benefit from a connection system that uses a transceiver while remedying the above-mentioned drawbacks of the prior art in full or in part.

OBJECT AND SUMMARY OF THE INVENTION

An object of the invention is to satisfy this need, and in exemplary embodiments the invention achieves this object by a plug for mounting on at least one cable having at least one optical conductor, the plug comprising:

a body and;
at least one optoelectronic converter provided with connection means arranged inside the body in a manner that is removable and interchangeable.

The optoelectronic converter is arranged in interchangeable manner in the body of the plug, i.e. it can be removed from or inserted into the body of the plug without modifying the structure of the body of the plug and/or the cabling of the remainder of the plug.

By arranging the optoelectronic converter within the body of the plug, it is possible for heat dissipation to take place through the body of the plug. In the invention, the optoelectronic converter is arranged in the plug before the plug is connected to a receptacle.

The body of the plug and the optoelectronic converter provided with connection means may be such that the optoelectronic converter can be removed and replaced without separating the plug from the cable. The configuration of the body of the plug and of the optoelectronic converter makes it possible in particular for the optoelectronic converter to be extracted from and replaced in the plug via the end of the plug that is to face the receptacle.

An electrical insulator may be interposed between the body of the plug and the optoelectronic converter when the converter is arranged in the plug. In this way, the casing of the optoelectronic converter and the body of the plug need not be at the same potential, thus making it possible to protect the optoelectronic converter, e.g. in the event of lightning striking the plug.

The plug may include at least one optical contact having one end connected to an optical conductor of the cable and having another end connected to the optoelectronic converter. With such a plug, the optical contact(s), e.g. LC contact(s), may be connected to the optoelectronic converter within the plug without it being connected to a receptacle, where making such a connection is an operation that can be relatively constraining. The optoelectronic converter can thus be connected to the optical contact(s) more easily by an operator.

The optoelectronic converter may be a transceiver of the small form factor pluggable (SFP) type, as defined by the SFF Committee, in accordance with the link ftp://ftp.seagate.com/sff/INF-8074.PDF.

The optoelectronic converter may be arranged in the plug in such a manner that the connection between the plug and a receptacle is performed by connecting an output of the optoelectronic converter to an element of the receptacle.

The body of the plug may comprise a bottom and a cover that is releasably mounted on the bottom. The releasable nature of the cover makes access easy to the optoelectronic converter, and this can facilitate inserting the optoelectronic converter in the body and/or replacing it and can also facilitate connecting it to the optical contact(s). The cover may be opaque. In preferred embodiments of the invention, the cover is made of metal, for electromagnetic shielding purposes.

The cover and the bottom of the body may include means for holding the optoelectronic converter in a position inside the body of the plug that is stationary, at least in one direction and possibly in one direction only, once the cover and the bottom have been assembled together. Steps or notches formed in the cover and/or in the bottom may co-operate for example with complementary steps or ribs of the optoelectronic converter for this purpose.

The cross-sectional shape of the body may be circular, rectangular, or some other shape. The cross-section of the body may be constant or it may vary along the longitudinal axis of the body.

In first exemplary embodiments of the invention, the body includes a single housing in which the optoelectronic converter is placed. In this embodiment, the plug may be configured to be mounted on a single cable having one or more optical conductors.

In second exemplary embodiments of the invention, the body includes at least a first housing in which the optoelectronic converter is received, and at least a second housing in which at least one contact other than an optical contact is received, in particular a power contact. The contact other than an optical contact may be a signal contact, e.g. a multiple contact of the Ethernet RJ45 or of the universal serial bus (USB) type, or it may be a power contact, in particular a contact having two copper conductors, e.g. presenting a sectional area of 2.5 square millimeters ($mm^2$) at positive and negative potentials.

The first and second housings may be separated by a wall providing electromagnetic shielding between the two housings. Such a wall may guarantee that different signals are conveyed inside the body of the plug without mutual interference.

In this second embodiment of the invention, the body is configured to be mounted on an optical cable and on a cable other than an optical cable, in particular a power cable, the cables being respectively connected to the optical contact(s) and to the contact(s) other than optical contact(s) of the plug, in particular to the power contact(s).

The body may thus include two holes at one end for passing the optical cable and the cable that is other than an optical cable, in particular a power cable. Below, the term "optical cable" or "purely optical cable" is used to designate a cable having optical conductors only, e.g. optical fibers, and the term "cable other than an optical cable" is used to designate a cable having no optical conductors.

In third exemplary embodiments of the invention, the body has a single housing within which there is arranged a cartridge carrying the optoelectronic converter and at least one contact other than an optical contact, in particular a power contact. By way of example, the cartridge is a part extending along a longitudinal axis and having a perforated side surface between two longitudinal ends of tubular shape through which passages are defined to receive the optoelectronic converter and one or more contacts other than optical contacts, in particular power contacts. The cartridge may be made of an electrically insulating material.

The passages may be arranged in such a manner that the optical and other channels, in particular power channels, are superposed along the longitudinal axis of the cartridge over some or all of its length.

In this third embodiment of the invention, the plug may be configured to be mounted on a hybrid cable, i.e. in the meaning of the invention, a cable comprising at least one optical conductor and at least one conductor other than an optical conductor, in particular a power conductor.

Other exemplary embodiments of the invention also provide a set of plugs, wherein the set comprises:
 a first plug having a body that includes a single housing in which an optoelectronic converter is arranged; and
 a second plug other than an optical plug, in particular a power plug, said second plug having a second body and at least one contact other than an optical contact, in particular a power contact, the second body and the body of the first plug having substantially the same dimensions.

By way of example, the first plug is purely an optical plug while the second plug is purely a power plug, i.e. a plug having power contacts only.

Means may be provided for securing the two plugs together in permanent or non-permanent manner, these means being carried, for example, by the bodies of each of the plugs and co-operating with each other. These means may be carried by each of the plugs, e.g. they may be snap-fastener tabs. In a variant, these means may comprise a clamping collar arranged around both plugs.

Once the two plugs have been secured to each other they may be connected to one or more receptacles in a single operation.

Because of the variety of the above-described plugs, the invention can offer a high degree of modularity to users, enabling them to adapt to changes in their requirements.

The second plug other than an optical plug may be used independently of the first plug, and is not restricted to being associated with the first plug.

In other exemplary embodiments, the invention also provides a receptacle configured to be connected with the above-described plug, wherein the receptacle comprises:
 at least one sub-receptacle suitable for being connected to, in particular mounted on, the electronic circuit card of electronic equipment and configured to be connected to the optoelectronic converter of the plug; and
 a locking system for locking the receptacle to the plug, the locking system being distinct from the sub-receptacle.

Making the sub-receptacle and the locking system as distinct elements enables the electrical interface of the receptacle to be aligned in satisfactory manner with the electrical interface of the plug formed by the optoelectronic converter arranged in the plug. By way of example, the locking system is carried by a panel while the sub-receptacle is not mounted on the panel.

The plug may be connected to the receptacle by moving the plug or the receptacle along an axis, and the locking system may serve to align the electrical interface of the receptacle with the electrical interface of the plug along a dimension measured parallel to said axis while the sub-receptacle may enable the electrical interface of the receptacle and the electrical interface of the plug to be aligned in a plane perpendicular to said axis.

The sub-receptacle may be arranged facing an opening formed in a panel, which opening may give access to the sub-receptacle through the panel. By way of example, the panel may form a portion of a piece of electronic equipment.

The locking system may include a rim projecting from the panel and defining the outside of the opening. The rim may be formed integrally with the panel, or in a variant it may be formed by a part that is fitted to the panel.

The locking system may include at least one removable locking means on the plug, said removable locking means being carried by the rim. These locking means may be fitted on the rim. The rim may carry at least one tongue made of an electrically conductive material, the tongue being configured to come into contact with the body of the plug. Such a tongue may serve to establish electric potential continuity between the body of the plug and the panel.

The receptacle may include a sub-receptacle configured to be connected to at least one contact other than an optical contact, in particular a power contact.

In a variant, in addition to the receptacle including a sub-receptacle configured to be connected to the optoelectronic converter of the plug, at least one second receptacle may be provided. The second receptacle may include a sub-receptacle configured to be connected to at least one contact other than an optical contact, in particular a power contact.

The panel may include at least one second opening giving access to the sub-receptacle of the second receptacle through the panel, this opening preferably being arranged facing said sub-receptacle. In a variant, the access to this sub-receptacle may be achieved through the same opening as that described above, with no additional opening being formed in the panel for the second receptacle.

When a plurality of openings are formed in the panel and arranged in register with each of the sub-receptacles, these openings may present substantially the same dimensions.

In another variant, the panel has only a single opening for connection to the optoelectronic converter of the plug, and it is possible to provide another panel with an opening for a receptacle enabling a connection to be made with a plug conveying a signal other than an optical signal, in particular a power signal. Means may be provided for securing the two panels together optionally in permanent manner.

The above-described embodiments of the invention make it possible to provide a wide variety of connections optionally involving signals of several types.

Plugs and receptacles as described above may be configured so that for any given plug-and-receptacle pair, means are provided for achieving electromagnetic shielding, which means enable the body of the plug, the casing of the optoelectronic converter, the panel, a braid of the cable(s) on which the plug is mounted, and the sub-receptacle connected to the optoelectronic converter all to be grounded.

As mentioned above, in a variant, the optoelectronic converter is electrically insulated relative to the body of the plug and the casing of the optoelectronic converter is at the same potential as the sub-receptacle, while the body of the plug and the panel are both at the same potential.

Other exemplary embodiments of the invention also provide a connection system comprising:
 a plug with an optoelectronic converter as defined above; and
 a receptacle configured to be connected to the plug and associated with a panel, the receptacle being as defined above; the receptacle and the plug being configured in such a manner that when the plug and the receptacle are connected together, the optoelectronic converter remains at least in part beside the panel in which the major portion of the plug extends, which means that during the operation of connecting the plug to the receptacle, the optoelectronic converter penetrates very little if at all into an opening formed in the panel in order to be connected to the sub-receptacle. Such an arrangement enables the heat generated by the optoelectronic converter in operation to be dissipated outside the panel and not inside it.

This relative arrangement of the optoelectronic converter and of the panel, once the plug has been connected to the receptacle, may be obtained by having sufficient distance between the end of the body of the plug facing the receptacle and the position of the optoelectronic converter in the plug, and/or by adjusting the locking system of the receptacle to prevent the plug from moving relative to the receptacle along the plug insertion axis.

In other exemplary embodiments, the invention also provides a method of connecting an above-described plug with an above-described receptacle, the method comprising the following steps:
 inserting the plug along an axis at least in part into the opening of a panel carrying the locking system of the receptacle;
 aligning the electrical interface of the plug and the electrical interface of the receptacle along a dimension measured parallel to said axis with the help of the locking system of the receptacle; and
 aligning the electrical interface of the plug and the electrical interface of the receptacle in a plane perpendicular to said axis with the help of the sub-receptacle of the receptacle that is configured to be connected to the optoelectronic converter.

The two above-mentioned alignment steps may be performed simultaneously or otherwise.

By way of example, the sub-receptacle comprises a cage having dimensions in a plane perpendicular to said axis that are adjusted to match the dimensions in the same plane of the optoelectronic converter.

Alignment may be made possible in the plane perpendicular to said axis with the help of chamfers carried by the cage and/or the end of the body of the plug facing the receptacle and/or the casing of the optoelectronic converter. By way of example, the locking system comprises a locking part that enables the plug to be prevented from moving along said axis relative to the receptacle, and no movement of the plug relative to the receptacle in the plane perpendicular to said axis of the plug is possible once the plug has been prevented from moving along said axis, in which case the two above-described alignment steps take place simultaneously.

The locking part may be configured to enable movement to be prevented along said axis while also compensating for misalignment between the plug and the receptacle in the plane perpendicular to said axis.

In a variant, alignment in the panel perpendicular to said axis is obtained by directly moving the optoelectronic converter, the converter being received in floating manner in the body of the plug, at least in a direction perpendicular to said axis.

It is possible to use other means for obtaining this alignment between the electrical interface of the plug and the electrical interface of the receptacle in a plane perpendicular to said axis, with the plug being prevented from moving along said axis relative to the receptacle, e.g. means as described in the application filed in France under the No. 09 59137 and enabling the receptacle to be previously positioned relative to the panel, e.g. the stopper as described in that application.

BRIEF DESCRIPTION OF THE DRAWINGS

The invention can be better understood on reading the following description of non-limiting embodiments thereof and on examining the accompanying drawings, in which:

FIGS. 4 to 6 show a second embodiment of the invention, FIG. 4 being similar to FIG. 1, FIG. 5 being similar to FIG. 3, and FIG. 6 showing the FIG. 4 receptacle;

FIGS. 7 and 8 are diagrams of a plug and of a piece of electronic equipment similar to those shown in FIGS. 1 to 3 and adapted to conveying a power signal;

FIG. 9 is a diagrammatic view of a variant of FIGS. 1 to 4;

FIGS. 10 to 13 show another embodiment of the invention, FIG. 10 being a fragmentary view of a plug, FIG. 11 showing a receptacle for connection to the FIG. 10 plug, and FIGS. 12 and 13 being section views of the FIG. 10 plug and of the FIG. 11 receptacle; and FIGS. 14 to 17 show two other embodiments of a plug of the invention, FIGS. 15 and 17 being section views respectively on XV-XV and XVII-XVII of FIGS. 14 and 16.

DETAILED DESCRIPTION OF THE INVENTION

Figure 1:
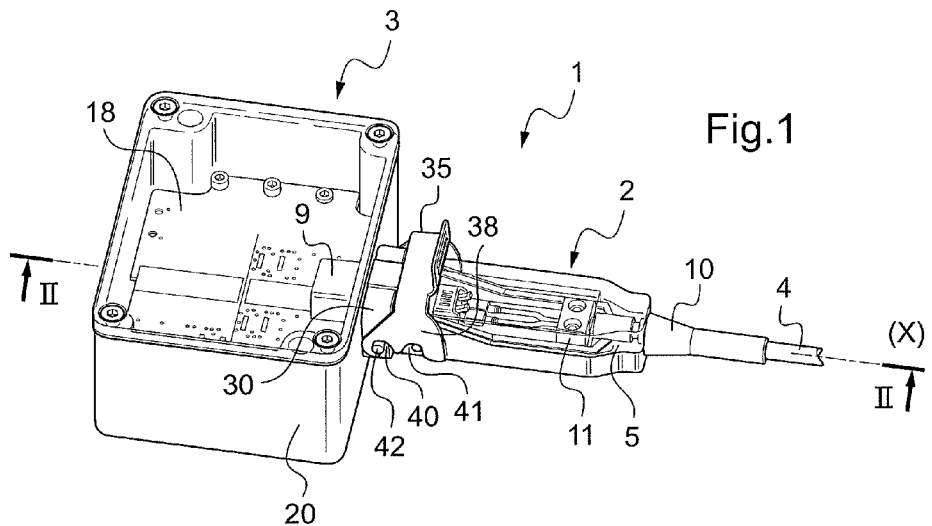
FIGS. 1 to 3 show a first embodiment of the invention, FIG. 1 showing a plug and a piece of electrical equipment in a first embodiment, FIG. 2 being a section view on II-II of FIG. 1, and FIG. 3 showing the FIG. 1 plug in isolation.

FIG. 1 shows a connection system given overall reference 1 and configured to convey an optical signal. The system 1 comprises a plug given overall reference 2 and a receptacle that enables the plug to be connected to a piece of electronic equipment given overall reference 3.

Figure 2:
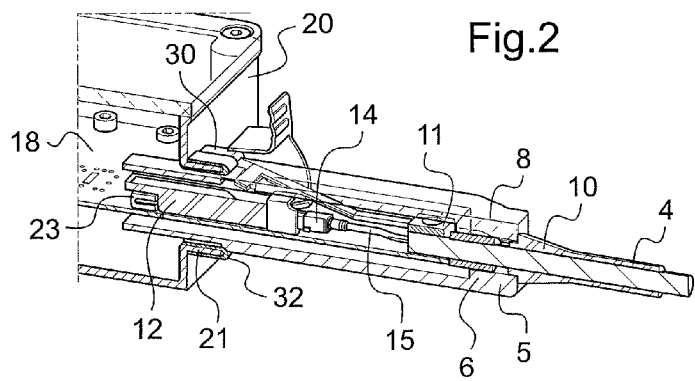
Figure 3:
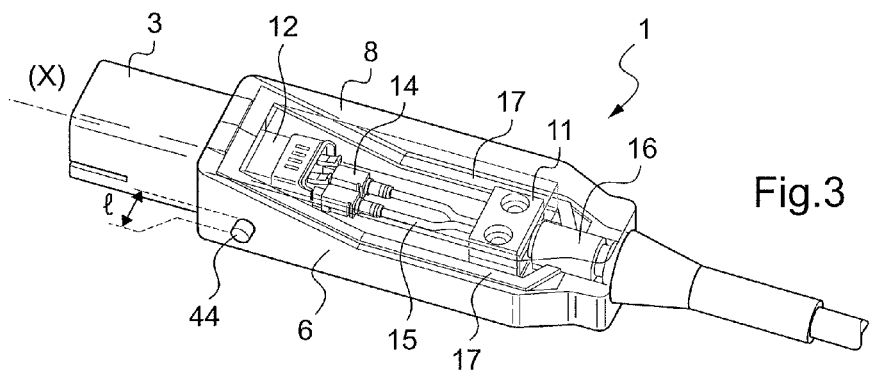

As can be seen in FIGS. 1 to 3, the plug 2 may be configured for mounting on a single cable 4 that may include optical conductors only. The plug 2 comprises a body given overall reference 5 that may be made up of a plurality of parts. The body 5 in the example under consideration extends along a rectilinear longitudinal axis X.

By way of example, the body 5 comprises a bottom 6 and a cover 8 for removably installing on the bottom 6. The shapes of the bottom 6 and of the cover 8 may be complementary. The bottom 6 and the cover 8 may be made of the same material, e.g. pressure die-cast aluminum, zamac coated in zinc-nickel, or indeed plastics material(s), with or without metal coating.

The body may have a front end 9 for inserting into the electronic equipment 3 and in the shape of a nose. This front end 9 may present a transverse size that is smaller than the transverse size of the remainder of the body 5, independently of its shape.

Mounting the plug 2 on the cable 4 may be made easier by a part 10 that is designed to be arranged on the rear end of the plug 2. By way of example, this part 10 is a cable gland for retaining the cable 4 or a flexible sleeve configured to accompany bending of the cable 4.

As can be seen in FIGS. 1 to 3, a single housing may be defined in the body 5. A part 11 serving to hold the cable 4 in the housing in the body 5 and an optoelectronic converter 12, also known as a transceiver, may be arranged inside the housing. By way of example, the transceiver 12 is arranged in the housing in the front end 9 of the body 5. In the example shown, the optoelectronic converter is in contact with the body 5 of the plug, such that the casing of the optoelectronic converter is at the same electrical potential as the body 5 of the plug 2.

One or more optical contacts 14 may be connected at one end to an optical conductor 15, in particular an optical fiber, of the cable 4, and may be connected at an opposite end to an input of the transceiver 12. By way of example, the optical contacts 14 are LC type contacts, and the optoelectronic converter 12 is an SFP type transceiver, for example.

As shown in FIGS. 1 to 3, a sealing gasket 16 may be arranged in the housing formed in the body 5. The gasket 16 may have two branches 17 with two ends that join together and come into contact with a shielding braid of the cable 4. The other ends of the two branches are connected together substantially over the optoelectronic converter 12.

Other examples of sealing gaskets 16 are shown in FIGS. 15 and 17. These figures also show other examples of a plug 2 with a cable gland 10.

The above-described plug 2 may be assembled as follows: with the cover 8 removed, the optoelectronic converter 12 can be inserted into the housing of the body 5 and the contacts 14 can be mounted on the conductors 15 of the cable 4. Thereafter, the contacts 14 can be connected to respective inputs of the optoelectronic converter 12, and then the cover 8 can be put back into place on the bottom 6. Means may be provided for holding the optoelectronic converter 12 in a stationary position, at least along the dimension measured along the axis X of the plug 2. By way of example, these means may comprise at least one notch 100 formed in the bottom 6 of the body 5 and a rib 101 carried by the optoelectronic converter 12, as shown in FIGS. 14 and 16. A peg 102 may be carried by the optoelectronic converter 12 to come into abutment against a step 103 formed in the inside wall of the cover 8 of the body 5.

The receptacle makes it possible to connect with the electronic equipment 3. This receptacle comprises a sub-receptacle 23 configured to be connected to the optoelectronic converter 12. By way of example, it may be a sub-receptacle of the SFP type. By way of example, this sub-receptacle 23 is mounted, e.g. by soldering, on an electronic circuit card 18 arranged in the electronic equipment 3, or in a variant it is merely connected to the electronic circuit card 18.

The receptacle is shown in greater detail in FIG. 2. As can be seen, the electronic equipment 3 has a panel 20 with an opening 21 formed therein. A rim 30 serves to define the outside of the opening 21. This rim 30 may project out from the electronic equipment 3 and it is made integrally with the panel 20, or else in a variant and as described below it may be formed by a part that is fitted on the panel 20.

As can be seen in FIG. 2, one or more tongues 32 may be carried by the rim 30. These tongues may extend only over the face of the rim 30 that faces the opening, or they may also extend over the other face of the rim 30. These tongues 32 may be made of metal, thus constituting grounding bands that may serve to establish electrical continuity between the body 5 of the plug 2 and the panel 20.

As shown in FIGS. 1 and 2, the receptacle has a system for locking onto the plug 2. This locking system may comprise a removable fastener part 35 for fastening the receptacle to the plug 2. By way of example, the part 35 is made of metal and may present a U-shaped section. The part 35 may be pivoted about an axis perpendicular to the axis of the opening 21, which axis, in the example described, is parallel to the axis X once the plug 2 is connected to the receptacle.

By way of example, the part 35 has two side walls 38, each having two notches 40 and 41 formed therein. In the example shown, the notch 40 is configured to co-operate with a peg 42 formed on the outside face of the rim 30, thereby serving to fasten the part 35 on the rim and thus on the panel 20, while the notch 41 is configured to co-operate with a peg 44 formed on the side wall of the body 5, e.g. a side wall of the bottom 6 of the body 5. This locking system enables the plug to be prevented from moving along the axis X relative to the receptacle.

In the example shown, this is achieved when the pegs 42 and 44 are received in the notches 40 and 41. Each of the pegs 44 of the body 5 of the plug 2 may extend perpendicularly to the axis X over a length l such that the plug 2 can be prevented from moving relative to the receptacle along the axis X, while compensating for misalignment in the plane perpendicular to the axis X, since the length l of the pegs 44 enables them to remain within the notches 41 in spite of such misalignment.

The system 1 described with reference to FIGS. 1 to 3 is suitable for making a purely optical connection only. Nevertheless, the system of the invention may be used for conveying other types of signal, as described below with reference to FIGS. 7 and 8. These figures show electronic equipment 3' and a plug 2' that differ from those described with reference to FIGS. 1 to 3 solely by the fact that the signal being conveyed is other than optical, e.g. being a power signal or some other signal. The plug 2' shown in FIG. 8 may differ from that shown in FIGS. 1 to 3 solely by the absence of the optoelectronic converter 12 and by the optical contacts 14 being replaced by contacts 14' that are other than optical, in particular power contacts. As can be seen, a sealing gasket 16' similar to that described with reference to FIGS. 1 to 3 may be provided.

FIG. 9 shows a variant in which a plug 2 as described with reference to FIGS. 1 to 3 and a plug 2' as described with reference to FIGS. 7 and 8 are both connected to a single piece of electronic equipment 3. By way of example, the panel 20 of the electronic equipment 3 has two openings 21 and 21', each being associated with a respective receptacle. By way of example, the opening 21 is associated with a receptacle having a sub-receptacle 23 configured to be connected to the optoelectronic converter 12 of the plug 2, while the other opening 21' is associated with a receptacle having a sub-receptacle configured to be connected to the contact(s) that are other than optical in the plug 2'.

There follows a description with reference to FIGS. 4 to 6 of another embodiment of the invention. In this embodiment, the plug 2 and the electronic equipment are hybrid and no longer purely optical as in the example of FIGS. 1 to 3, i.e. they convey one or more signals that are other than optical signals.

As can be seen in FIG. 4, the plug 2 in this embodiment is configured to be mounted both on a cable 4 having optical conductors 15, as described above, and on a cable 48 that is other than optical, e.g. a power cable.

Two housings 50 and 51 may be formed inside the body 5, each of these housings then possibly extending over substantially the entire length of the body 5. The housing 50 receives optical contacts 14 and the optoelectronic converter 12 similar to the housing described with reference to FIGS. 1 to 3. The housing 51 receives contacts 52 other than optical contacts that are mounted on the conductors of the cable 48, and in the example described, the contacts are power contacts.

As can be seen in FIGS. 4 and 5, these two housings 50 and 51 may be separated by a wall 53. This wall may be configured to provide electromagnetic shielding between the housings 50 and 51 so that the signals from the cables 4 and 48 do not interfere with one another. This wall 53 may for example be made of aluminum or of zamac.

As shown in FIG. 6, the receptacle for connection to the electronic equipment 3 may then include both a sub-receptacle 23 as described above for connecting to the optoelectronic converter 12, and a second sub-receptacle 25 configured to be connected to the contact(s) 52 that are other than optical, and that in this example are power contacts. In the embodiment of FIG. 6, the sole opening 21 formed in the panel 20 enables the hybrid plug to be connected to both sub-receptacles 23 and 55.

There follows a description with reference to FIGS. 10 to 13 of a plug 2 and a piece of electronic equipment 3 in another embodiment of the invention. In this embodiment, the plug is hybrid, conveying one or more optical signals together with signals of other types, e.g. power signals. The plug 2 in this embodiment is configured to be mounted on a hybrid cable 65 having both optical conductors 15 such as optical fibers and non-optical conductors 66, e.g. power conductors.

As can be seen in FIG. 10, where the body 5 of the plug is not shown, the plug 2 may include a cartridge 60 extending longitudinally along the axis X of the body and including a perforated surface between its two longitudinal ends 61 and 62. This cartridge may be made of plastics material so that the casing of the optoelectronic converter 12 and the body 5 of the plug 2 are not at the same electric potential.

The longitudinal ends 61 and 62 of the cartridge 60 may then be provided with channels for passing optical and other signals, e.g. power signals.

By way of example, the end 61 has an outside shape that is substantially cylindrical and it may include two cavities 63 each serving to pass a power conductor 66 of the hybrid cable 65. A housing may be provided in this end 61 for receiving an end of the optoelectronic converter 12.

These cavities 67 may also be provided in the other longitudinal end 62 of the cartridge 60, these cavities 67 serving to receive contacts other than optical contacts, e.g. power contacts 52 connected to the power conductors 66 of the hybrid cable 65. A housing may also be provided in the end 62 for receiving another end of the optoelectronic converter 12.

The plug described with reference to FIG. 10 is configured to be connected to a receptacle shown in FIG. 11. This receptacle serves to connect with electronic equipment 3 having a panel 20 carrying a rim 30. The rim 30 in this example is formed by a part 70 fitted on the panel 20. By way of example, the rim 30 is a tubular portion 71 and a fastener plate 72. The part 70 is placed around an opening 21 in register with a sub-receptacle 23 similar to that described above, and with a sub-receptacle 55 configured to be connected to the power contact(s) 52 of the plug 2.

In the embodiment of FIGS. 10 to 13, the plug 2 also includes a nut 80 and a cable gland 10. The nut and the cable gland may for example be as described in application EP 2 239 605, the content of which is incorporated in the present application by reference, or such as described in the application filed in France under the No. 09 59137, the content of which is likewise incorporated in the present application by reference.

The plug 2 in the embodiments of FIGS. 10 to 13 may be assembled as follows.

The optoelectronic converter 12 is inserted into the cartridge 60 within housings provided in each of the longitudinal ends 61 and 62. The power contacts 52 are arranged in each of the cavities 67 formed in the end 62 of the cartridge 60. Optical contacts 14 are connected to an input of the optoelectronic converter 12.

The cartridge 60 is then inserted into the body 5 of the plug 2 and the nut 80 is screwed onto the rear end of the body 5 so as to hold the cartridge 60 captive inside the body 5. The cable gland 10 is then mounted on the rear of the nut 80.

The plug 2 as assembled in this way can then be connected to the two sub-receptacles 23 and 55 after passing through the opening 21 in the panel 20.

As explained above, the invention enables the optoelectronic converter 12 to be connected to the optical conductor(s) 15 of a cable via optical contact(s) 14 before the plug 2 is connected to a receptacle for making connection with the electronic equipment 3.

The invention makes it possible to obtain a system for connecting a cable to a receptacle that presents satisfactory electromagnetic and mechanical shielding. The braid of the cable may be stripped at least in part and put into contact with the body 5 of the plug 2. The cable gland 10 of the above figures is advantageously configured to enable such an electrical contact to be made between the braid of the cable and the body of the plug.

In all of the above-described examples, once the plug 2 and the receptacle have been connected together, the optoelectronic converter is situated at least in part outside the electronic equipment 3, being completely or in part beside the panel 20 in which the major portion of the plug 2 extends, as can be seen in particular in FIGS. 2, 4, and 14.

The alignment of the electrical interface of the receptacle with the electrical interface of the plug 2, i.e. in the above examples of the optoelectronic converter 12 and of the sub-receptacle 23, may be achieved in a single step. After the plug has been moved along the axis X towards the opening 21, the locking means 35 are folded down so that the pegs 44 are received in the notches 41, thereby enabling the plug 2 to be prevented from moving relative to the receptacle along the axis X. Simultaneously, the optoelectronic converter and the sub-receptacle 23 may be aligned perpendicularly to the axis X because of chamfers carried by the sub-receptacle 23 and/ or by the end 9 of the body 5 of the plug 2 and/or by the front end of the casing of the optoelectronic converter 12. By way of example, this alignment is performed by moving the body 5 of the plug 2 or directly by moving the optoelectronic converter 12.

The plug and/or the receptacle obtained in accordance with all or some of the various embodiments described above may be configured to operate at temperatures lying in the range −40° C. to +125° C.

In terms of sealing, the plug and/or the receptacle may satisfy the standard IP65, IP67, or IP68.

The above-described plug(s) and receptacle(s) can be connected and disconnected in particularly simple manner.

Plug(s) and receptacle(s) as described above can enable a large number of connections to be established over a small area of panel, thus enabling high connection density to be obtained.

The invention is not limited to the embodiments described above.

The expression "including a" should be understood as meaning "including at least one" unless specified to the contrary.

What is claimed is:

1. A plug for mounting on at least one cable having at least one optical conductor, the plug comprising:
    a body; and
    at least one transceiver provided with at least one optical contact arranged inside the body in a removable and interchangeable manner.

2. The plug according to claim 1, wherein the at least one optical contact includes:
    one end connected to an optical conductor of the cable; and
    another end connected to the transceiver.

3. The plug according to claim 1, wherein the body includes:
    at least a first housing in which the transceiver is received, and
    at least a second housing in which at least one contact other than an optical contact is received.

4. The plug according to claim 3, wherein the first and second housings are separated by a wall providing electromagnetic shielding between the two housings.

5. The plug according to claim 3, wherein the body is configured to be mounted on an optical cable and on a cable other than an optical cable, in particular a power cable, the cables being respectively connected to the at least one optical contact and to the at least one contact other than the at least one optical contact of the plug.

6. The plug according to claim 1, wherein the body includes:
    a single housing within which there is arranged a cartridge carrying the transceiver; and
    at least one contact other than an optical contact.

7. The plug according to claim 6, wherein the plug is configured to be mounted on a hybrid that includes:
    at least one optical conductor; and
    at least one conductor other than an optical conductor.

8. The plug according to claim 1, wherein the body includes a single housing in which the transceiver is placed.

9. The plug according to claim 1, wherein the transceiver is an SFP type transceiver.

10. A set of plugs, comprising:
    a first plug according to claim 1; and
    a second plug other than an optical plug, the second plug having a second body and at least one contact other than an optical contact, the second body and the body of the first plug having substantially the same dimensions.

11. The set according to claim 10, wherein the first and second plugs have means enabling the first plug and the second plug to be secured to each other, optionally in permanent manner.

12. A receptacle configured to connect to the plug according to claim 1, the receptacle comprising:
    at least one sub-receptacle configured to connect to: (i) an electronic circuit card of electronic equipment, and (ii) the transceiver of the plug; and
    a locking system configured to lock the receptacle to the plug, the locking system being distinct from the sub-receptacle.

13. The receptacle according to claim 12, wherein the locking system has a rim projecting from a panel associated with the receptacle.

14. The receptacle according to claim 13, wherein the rim is made integrally with the panel or is formed by a part fitted on the panel.

15. The receptacle according to claim 13, wherein the locking system includes at least one removable locking means on the plug, the removable locking means being carried by the rim.

16. The receptacle according to claim 12, including a sub-receptacle configured to be connected to at least one contact other than an optical contact, in particular a power contact.

17. A connection system, comprising:
    a plug including:
        a body, and
        at least one transceiver provided with at least one optical contact arranged inside the body in a removable and interchangeable manner; and
    a receptacle according to claim 12, associated with a panel, wherein
    the receptacle and the plug are configured such that when the plug and the receptacle are connected together, the transceiver remains at least in part beside the panel in which a major portion of the plug extends.

18. The system according to claim 17, wherein the plug and the receptacle are configured so that the body of the plug, a casing of the transceiver, the panel, a braid of the at least one cable on which the plug is mounted, and the sub-receptacle connected to the transceiver are grounded when the plug is connected to the receptacle.

19. The system according to claim 17, wherein the transceiver is electrically insulated relative to the body of the plug.

20. A method of connecting a plug to a receptacle according to claim 12, the method comprising the following steps:
    inserting the plug along an axis at least in part into the opening of a panel carrying the locking system of the receptacle;
    aligning an electrical interface of the plug and the electrical interface of the receptacle along a dimension measured parallel to of the axis assisted by the locking system of the receptacle; and
    aligning the electrical interface of the plug and the electrical interface of the receptacle in a plane perpendicular to the axis assisted by the sub-receptacle of the receptacle that is configured to be connected to the transceiver, wherein
    the plug includes a body and at least one transceiver provided with at least on optical contact arranged inside the body in a removable and interchangeable manner.

* * * * *